United States Patent
Torii et al.

(10) Patent No.: US 10,479,202 B2
(45) Date of Patent: Nov. 19, 2019

(54) VEHICLE DISPLAY SYSTEM AND METHOD OF CONTROLLING VEHICLE DISPLAY SYSTEM

(71) Applicant: SUBARU CORPORATION, Tokyo (JP)

(72) Inventors: Takeshi Torii, Tokyo (JP); Noeru Sato, Tokyo (JP); Ryuichi Sumikawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 15/898,251

(22) Filed: Feb. 16, 2018

(65) Prior Publication Data
US 2018/0264944 A1    Sep. 20, 2018

(30) Foreign Application Priority Data

Mar. 15, 2017    (JP) .................................. 2017-050348

(51) Int. Cl.
| | |
|---|---|
| *B60K 35/00* | (2006.01) |
| *G02B 27/01* | (2006.01) |
| *B60Q 1/50* | (2006.01) |
| *G08G 1/16* | (2006.01) |
| *B60Q 1/26* | (2006.01) |

(52) U.S. Cl.
CPC .............. *B60K 35/00* (2013.01); *B60Q 1/268* (2013.01); *B60Q 1/50* (2013.01); *G02B 27/01* (2013.01); *G02B 27/0101* (2013.01); *G08G 1/166* (2013.01); *B60K 2370/149* (2019.05); *B60K 2370/157* (2019.05); *B60K 2370/1529* (2019.05); *B60K 2370/186* (2019.05); *B60K 2370/1868* (2019.05);

(Continued)

(58) Field of Classification Search
None
See application file for complete search history.

(56) References Cited

U.S. PATENT DOCUMENTS

| | | | | |
|---|---|---|---|---|
| 4,635,033 A | * | 1/1987 | Inukai ..................... | B60K 37/00 340/461 |
| 5,905,434 A | * | 5/1999 | Steffan ..................... | B60Q 1/50 116/28 R |

(Continued)

FOREIGN PATENT DOCUMENTS

| | | |
|---|---|---|
| JP | 2005-165422 A | 6/2005 |
| JP | 2007-052719 A | 3/2007 |

(Continued)

OTHER PUBLICATIONS

Japanese Office Action issued in corresponding Japanese Patent Application No. JP 2017-050348, dated Oct. 16, 2018, with English Translation.

*Primary Examiner* — Curtis J King
(74) *Attorney, Agent, or Firm* — McDermott Will & Emery LLP (57) ABSTRACT

A vehicle display system includes a display device, a position acquiring unit, and a display controller. The display device is configured to provide a display on a window of a vehicle. The position acquiring unit is configured to acquire a position of a target person present outside the vehicle. The display controller is configured to control the display device to invert the display to be provided for the target person, on the basis of the position of the target person.

12 Claims, 6 Drawing Sheets

(52) U.S. Cl.
CPC .. *B60K 2370/191* (2019.05); *B60K 2370/193* (2019.05); *B60R 2300/205* (2013.01)

(56) References Cited

U.S. PATENT DOCUMENTS

| | | | | | |
|---|---|---|---|---|---|
| 6,300,870 | B1* | 10/2001 | Nelson | | B60Q 1/503 340/463 |
| 6,915,209 | B1* | 7/2005 | Spann | | B60Q 1/503 340/472 |
| 7,095,318 | B1* | 8/2006 | Bekhor | | B60Q 1/26 340/464 |
| 7,175,321 | B1* | 2/2007 | Lopez | | B60Q 1/50 296/21 |
| 7,641,369 | B1* | 1/2010 | Deveau | | B60Q 1/52 362/464 |
| 7,659,808 | B1* | 2/2010 | Cooper | | B60Q 1/503 340/425.5 |
| 8,893,416 | B1* | 11/2014 | McKenzie | | G09F 21/04 359/242 |
| 8,954,252 | B1* | 2/2015 | Urmson | | G08G 1/166 180/167 |
| 9,738,225 | B1* | 8/2017 | Au | | B60Q 1/2611 |
| 9,868,389 | B2* | 1/2018 | Williams | | B60Q 1/50 |
| 9,878,659 | B2* | 1/2018 | Williams | | B60Q 1/50 |
| 9,953,538 | B1* | 4/2018 | Matthiesen | | G08G 1/166 |
| 9,969,326 | B2* | 5/2018 | Ross | | B60Q 1/50 |
| 9,987,979 | B2* | 6/2018 | Kawamata | | B60Q 1/50 |
| 2004/0041983 | A1* | 3/2004 | Bleiner | | B60Q 1/52 353/13 |
| 2006/0221250 | A1* | 10/2006 | Rossbach | | G01S 17/89 348/630 |
| 2007/0019424 | A1* | 1/2007 | Alexander | | B60Q 1/268 362/488 |
| 2008/0127534 | A1* | 6/2008 | Brown | | G09F 1/10 40/1 |
| 2009/0058761 | A1* | 3/2009 | Chen | | B60K 35/00 345/7 |
| 2009/0134984 | A1* | 5/2009 | Chen | | B60Q 1/268 340/425.5 |
| 2011/0199199 | A1* | 8/2011 | Perkins | | B60Q 1/506 340/435 |
| 2012/0089273 | A1* | 4/2012 | Seder | | B60Q 1/268 701/2 |
| 2014/0114502 | A1* | 4/2014 | Hugron | | B60W 50/14 701/2 |
| 2014/0240204 | A1* | 8/2014 | Chen | | G02B 27/01 345/2.3 |
| 2014/0268353 | A1* | 9/2014 | Fujimura | | G02B 27/0101 359/630 |
| 2015/0032328 | A1* | 1/2015 | Healey | | B60Q 1/503 701/36 |
| 2015/0134180 | A1* | 5/2015 | An | | G01C 21/34 701/23 |
| 2015/0336502 | A1* | 11/2015 | Hillis | | B60Q 1/26 701/23 |
| 2016/0159286 | A1* | 6/2016 | Harville | | B60Q 1/2665 340/438 |
| 2017/0088035 | A1* | 3/2017 | Williams | | B60Q 1/0094 |
| 2017/0182934 | A1* | 6/2017 | Arita | | B60Q 1/50 |
| 2017/0240098 | A1* | 8/2017 | Sweeney | | B60Q 1/2611 |
| 2017/0262715 | A1* | 9/2017 | Kozuka | | B60R 1/00 |
| 2018/0086262 | A1* | 3/2018 | Morel | | G08G 1/162 |
| 2018/0090011 | A1* | 3/2018 | Morel | | G08G 1/167 |
| 2018/0101018 | A1* | 4/2018 | Chung | | H04N 13/398 |
| 2018/0118099 | A1* | 5/2018 | Kunii | | B60Q 1/04 |
| 2018/0154819 | A1* | 6/2018 | Hoshino | | B60Q 1/085 |
| 2018/0174460 | A1* | 6/2018 | Jung | | B60Q 1/525 |

FOREIGN PATENT DOCUMENTS

| | | | |
|---|---|---|---|
| JP | 2017-007502 | * | 6/2015 |
| JP | 2017-007502 A | | 1/2017 |

* cited by examiner

VEHICLE DISPLAY SYSTEM AND METHOD OF CONTROLLING VEHICLE DISPLAY SYSTEM

CROSS-REFERENCE TO RELATED APPLICATIONS

The present application claims priority from Japanese Patent Application No. 2017-050348 filed on Mar. 15, 2017, the entire contents of which are hereby incorporated by reference.

BACKGROUND

The technology relates to a vehicle display system and a method of controlling the vehicle display system.

Japanese Unexamined Patent Application Publication (JP-A) No. 2007-52719 discloses an exemplary vehicle display device that displays a partly negative image.

SUMMARY

An aspect of the technology provides a vehicle display system that includes: a display device configured to provide a display on a window of a vehicle; a position acquiring unit that acquires a position of a target person present outside the vehicle; and a display controller that controls the display device to invert the display to be provided for the target person, on a basis of the position of the target person.

An aspect of the technology provides a method of controlling a vehicle display system. The method includes: acquiring a position of a target person present outside a vehicle, in which the vehicle includes a display device that provides a display on a window; and controlling the display device to invert the display to be provided for the target person, on a basis of the position of the target person.

An aspect of the technology provides a vehicle display system that includes: a display device configured to provide a display on a window of a vehicle; and circuitry configured to acquire a position of a target person present outside the vehicle, and controls the display device to invert the display to be provided for the target person, on a basis of the position of the target person.

DETAILED DESCRIPTION

When providing a display for a target person outside a vehicle, if a driver or other person inside the vehicle does not recognize a content of this display, for example, an appropriate display may not be provided to the target person outside the vehicle. A technique disclosed in JP-A No. 2007-52719 is, however, intended to invert a display provided for a driver to display a negative image and thus not intended to provide a display for a target person outside a vehicle.

It is desirable to provide a vehicle display system and a method of controlling the vehicle display system that both enable a person inside a vehicle to reliably recognize a display to be provided for a target outside the vehicle.

In the following, some non-limiting implementations of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Figure 1:
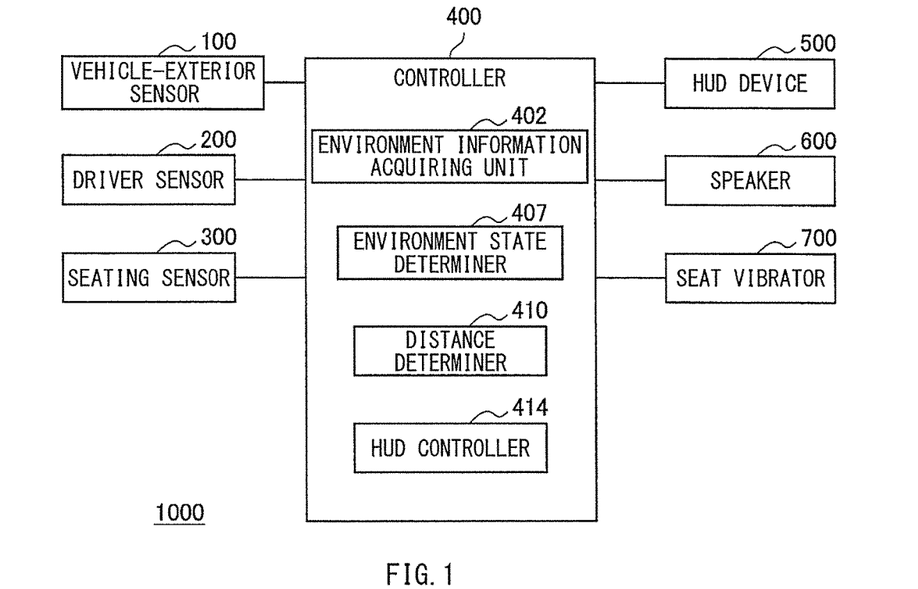
FIG. 1 schematically illustrates an example of a configuration of a vehicle display system according to one implementation of the technology.

FIG. 1 schematically illustrates an example of a configuration of a vehicle display system 1000 according to one implementation of the technology. The vehicle display system 1000 may be basically mounted in a vehicle. The vehicle may be, for example but not limited to, an automobile. Referring to FIG. 1, the vehicle display system 1000 may include vehicle-exterior sensors 100, a driver sensor 200, seating sensors 300, a controller 400, a head-up display (HUD) device 500, speakers 600, and seat vibrators 700. In one implementation, the speakers 600 may serve as a "warning sound generator".

Each of the vehicle-exterior sensors 100 may be a stereo camera, a monocular camera, millimeter wave radar, an infrared sensor, or any other sensing device. Each vehicle-exterior sensor 100 may measure a parameter such as, but not limited to, a position and speed of an object. Non-limiting examples of the object may include a vehicle and a person around the vehicle. In an example implementation, each vehicle-exterior sensor 100 may be a stereo camera that includes a pair of right and left cameras each having an imaging device such as, but not limited to, a charge-coupled device (CCD) sensor or a complementary metal-oxide semiconductor (CMOS) sensor. Then, the stereo camera may capture an image of an environment outside a vehicle and transmit information on the captured image to the controller 400. In an example implementation, the stereo camera may be a color camera disposed on an upper portion of a windshield of the vehicle and be able to acquire color information.

The HUD device 500 may be a display device that displays information directly in a human visual field. The HUD device 500 may display a real image on a window such as, but not limited to, the windshield or a rear window of the vehicle. Although a known HUD device typically displays a virtual image, the HUD device 500 in this implementation may be a display device that displays a real image. The HUD device 500 may display a real image at a viewing angle of about 360 degrees, thereby allowing both persons inside and outside the vehicle to view the image. In an alternative implementation, however, the HUD device 500 may display a virtual image.

Figure 2:
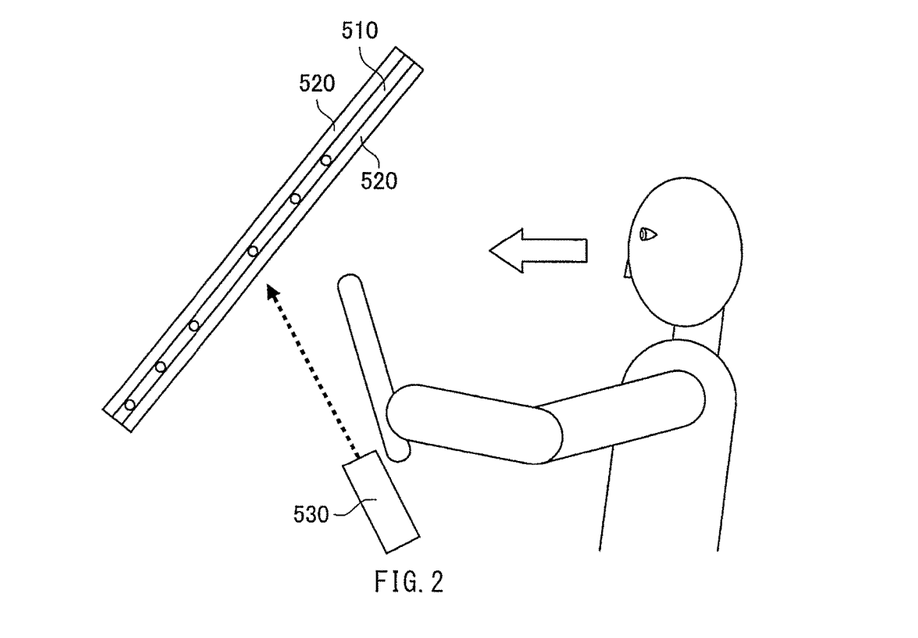
FIG. 2 schematically illustrates an example of a head-up display (HUD) device that includes a self-luminous interlayer film.

In one specific but non-limiting implementation, the HUD device 500 may be a device that includes a self-luminous interlayer film 510, as illustrated in FIG. 2. In such an implementation, the self-luminous interlayer film 510 may be disposed between two sheets of glass 520 in the window of the vehicle such as, but not limited to, the windshield and the rear window. The self-luminous interlayer film 510 may contain a luminescence material. When a portion of the self-luminous interlayer film 510 is irradiated with laser light from a projector 530 mounted in the vehicle, the irradiated portion may emit light, displaying objects, including characters and images. The objects may have visibility at all angles and may be thus viewable not only from the driver seat but also from the other seats as well as any position outside the vehicle. In an alternative implementation, the HUD device 500 may have a configuration in which a self-luminous device is disposed at the window of the vehicle. In such an alternative implementation, the HUD device 500 may have a transparent screen that contains an organic electroluminescence (EL) element, a transmissive liquid crystal device, or any other member that allows for transmissive displaying. In a further alternative implementation, any device other than the HUD device 500 may be used as the display device. In such an alternative implementation, a large-sized liquid crystal display device, a light-emitting diode (LED) display device, or any display device provided on a member such as, but not limited to, an instrument panel may be used as the display device. In the following, a description is given of one implementation in which the HUD device 500 provides a display on the window, such as the windshield and the rear window, of the vehicle. In one implementation, the HUD device 500 may serve as a "display device". The display device according to any implementation of the technology, however, is not limited to the HUD device 500. The term "HUD device" or "display device" according to any implementation of the technology encompasses any and all display devices provided inside and/or outside a vehicle. In an example implementation, the display device may be provided at any external site of the vehicle other than the window, such as a body of the vehicle. In an example implementation, the display device may be provided at any internal site of the vehicle other than the window, such as the instrument panel and a seat. The display devices disposed inside and outside the vehicle may be provided integrally with or separately from each other.

The driver sensor 200 may be implemented by a camera, a line-of-sight sensor, a motion sensor, or any other sensing device. This driver sensor 200 may measure movements of the driver's arms and head, a direction of his/her line of sight, and any other parameters related to the driver. In an example implementation where the driver sensor 200 is a camera, the driver sensor 200 may acquire the movements of the arms and head, the direction of the line of sight, and any other parameters by subjecting an image captured by the camera to image processing. In another example implementation where the driver sensor 200 is a line-of-sight sensor, the driver sensor 200 may detect the line of sight by using a corneal reflection method or any other similar method. The seating sensors 300 may be provided in the respective seats of the vehicle, and each of the seating sensors 300 may determine whether a person sits on a corresponding seat. The speakers 600 may emit a warning sound toward the inside and outside of the vehicle when the HUD device 500 displays a warning to persons inside and outside of the vehicle. The seat vibrators 700 may be provided in the respective seats inside the vehicle. In addition, the seat vibrators 700 may vibrate the seats to give a warning to the driver and occupants when the HUD device 500 displays a warning inside the vehicle.

The controller 400 may control the displaying performed by the HUD device 500 on the basis of the information detected by the vehicle-exterior sensors 100, the driver sensor 200, and other sensors. The controller 400 may include an environment information acquiring unit 402, an environment state determiner 407, a distance determiner 410, and a HUD controller 414. In one implementation, the environment information acquiring unit 402 may serve as a "position acquiring unit". In one implementation, the HUD controller 414 may serve as a "display controller". Each of the components of the controller 400 may be implemented in hardware or in software. In an example implementation where one component of the controller 400 is implemented in hardware, this component may be circuitry. In another example implementation where one component of the controller 400 is implemented in software, this component may be a program that causes a central processing unit (CPU) or other processor to perform its function.

The environment information acquiring unit 402 may acquire information on a distance to a target, namely, a subject in this case. This information may be called distance information. In an example implementation, the environment information acquiring unit 402 may generate the distance information, on the basis of an amount of shift between corresponding positions in a pair of right and left stereo images and by means of principle of triangulation. The pair of right and left stereo images may be captured by a set of right and left cameras of the stereo camera which constitutes each vehicle-exterior sensor 100 in one implementation. Together with the acquisition of the distance information, the environment information acquiring unit 402 may also acquire information on a position of the subject from the information on the images captured by the set of right and left cameras of the stereo camera which constitutes each vehicle-exterior sensor 100. This information may be called image information. Further, the environment information acquiring unit 402 may perform a known grouping process on the distance information generated by the principle of triangulation. Then, the environment information acquiring unit 402 may obtain data on a three-dimensional object, a lane line, and other objects by comparing the distance information subjected to the grouping process with preset three-dimensional data such as, but not limited to, three-dimensional object data. By performing the processes in this manner, the controller 400 is able to recognize various entities, including a person, another vehicle, a stop sign, a stop line, and an electronic toll collection (ETC) gate.

On the basis of the information on the distance to a factor generated by the principle of triangulation, the environment information acquiring unit 402 may also calculate a variation in the distance to the factor and/or a speed relative to the factor. Non-limiting examples of the factor may include a person and another vehicle. The variation in the distance may be determined by integrating distances to the factor in frame images. The frame images may be acquired at regular time intervals. The relative speed may be determined by dividing the distances acquired at regular time intervals by the unit time.

In the above manner, the environment information acquiring unit 402 may acquire the image information regarding an environment outside the vehicle, from the vehicle-exterior sensors 100. In addition, the environment information acquiring unit 402 may analyze the acquired image information through an image analyzing process. As a result of analyzing the image information, the environment information acquiring unit 402 may acquire environment information regarding the environment outside the vehicle.

Figure 3:
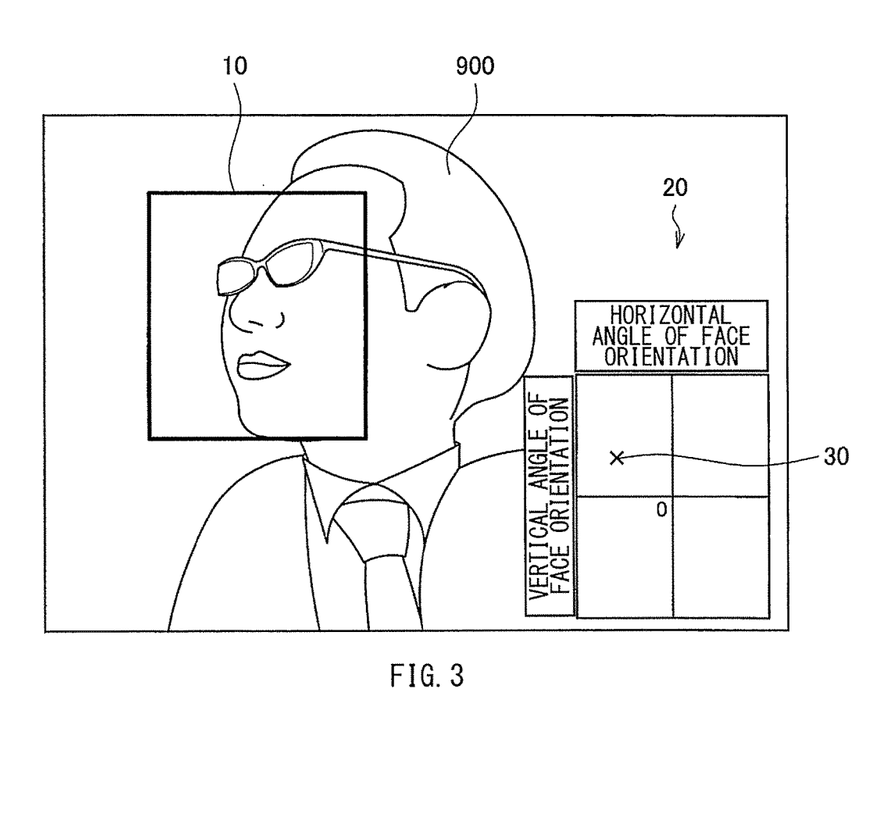
FIG. 3 schematically illustrates an example of a manner in which an angle at which a face of a target outside a vehicle is oriented and other face-related factors are calculated on the basis of a face region of the target.

FIG. 3 schematically illustrates an example of a manner in which an angle at which a face of a target person outside a vehicle is oriented and other face-related factors are calculated on the basis of the face region 10 of the target person. On the basis of a face region 10 of a person 900 which has been acquired from the image information, the environment state determiner 407 may monitor whether the face orientation of the person 900 falls outside a predetermined region. In such an implementation, the face region 10 of the person 900 may be defined from the position information on the feature points of the parts, including the eyes, the nose, and the mouth, of the face. In order to estimate the face orientation, as an example, the controller 400 may use, as a reference, a distance between the eyes as seen from the front and then may compare this reference with a distance between the eyes obtained from the image information. It may be determined that, as the distance between the eyes obtained from the image information becomes smaller than the reference, the face is oriented sideways more largely as seen from the front.

FIG. 3 illustrates a detection result 20 at its lower right. In the detection result 20, the vertical axis represents "vertical angle of face orientation", the horizontal axis represents "horizontal angle of face orientation", and an X-mark 30 denotes "detected angles of face orientation".

The environment state determiner 407 in the controller 400 may determine an environment state outside the vehicle on the basis of the environment information acquired by the environment information acquiring unit 402. Further, the environment state determiner 407 may determine a state of a person or a vehicle as a target outside the vehicle. The distance determiner 410 may determine a distance between the vehicle and the target outside the vehicle, on the basis of the distance information acquired by the environment information acquiring unit 402. The environment state determiner 407 may determine whether the person outside the vehicle is aware of the vehicle. In one implementation, the environment state determiner 407 may serve as a "determiner".

In one implementation, the HUD controller 414 may switch between displays to be performed by the HUD device 500, on the basis of a situation around the vehicle, in such a way that persons inside and outside the vehicle are able to realize for which person the display is intended. For example, the HUD controller 414 may switch between the displays in such a way that the persons inside and outside the vehicle are able to realize for which person the display is intended, by controlling the HUD device 500 to perform a display based on an animation that involves inversion of the display or by controlling the HUD device 500 to perform a display based on inversion of positive and negative images, on the basis of the situation around the vehicle.

In one specific but non-limiting implementation, the above situation around the vehicle may contain a distance to the target outside the vehicle. On the basis of the distance to the target, the distance determiner 410 may determine an urgent level. If the determined urgent level is high, the HUD controller 414 may control the HUD device 500 to provide a display for the target outside the vehicle immediately. However, if the urgent level is low, the HUD controller 414 may control the HUD device 500 to perform, before providing the display for the target outside the vehicle, a process of displaying the animation in which the display is inverted or a process of displaying the positive and the negative images in the inverted fashion. The driver is thereby expected to recognize a content of the display. Performing the inverted display in this manner makes it possible to help the driver or a person inside the vehicle perceive the content of the display which is intended even for the person outside the vehicle. Hence, if the urgent level is low, the HUD controller 414 may control the HUD device 500 to perform the inverted display so that the driver or other person inside the vehicle is able to reliably recognize the content of the display.

The situation around the vehicle may further contain information indicating whether the target is aware of the vehicle. If the target is not aware of the vehicle, the speaker 600 may make a horn or other sound in order to attract target's attention, after which the HUD controller 414 may control the HUD device 500 to provide the display for the target outside the vehicle. This makes it possible to help the target become aware of the display provided for the outside of the vehicle.

Figure 4:
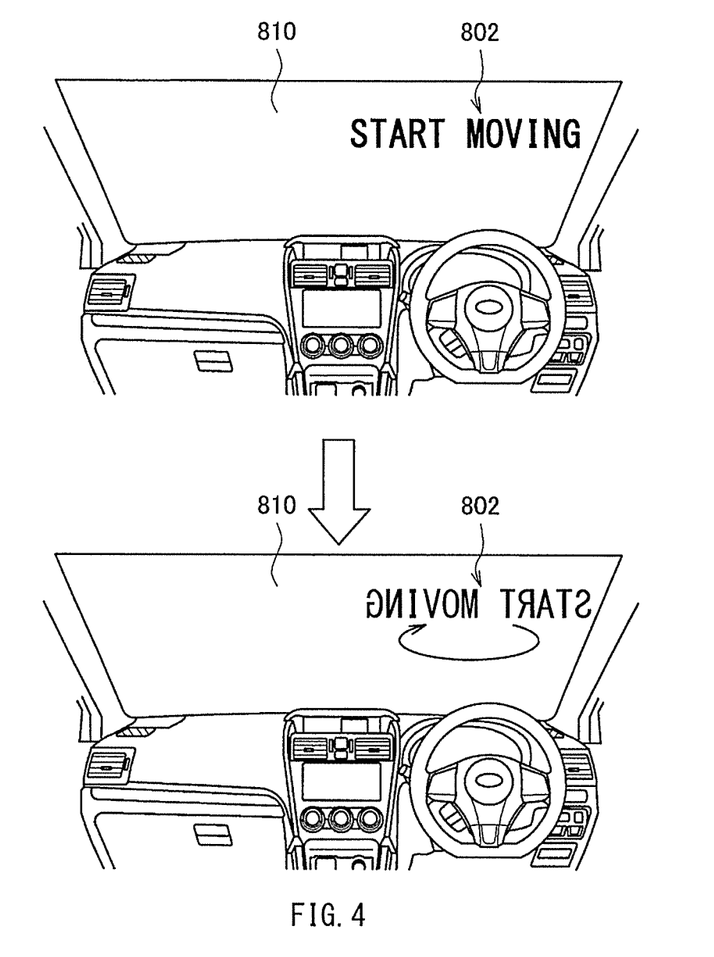
FIG. 4 schematically illustrates an example of a display based on an animation that involves inversion of the display.

FIG. 4 schematically illustrates an example of a display, according to one implementation, based on the animation that involves the inversion of the display. In one example illustrated in FIG. 4, the HUD controller 414 may control the HUD device 500 to provide a display 802 of a message saying "START MOVING" on the windshield 810 of the vehicle upon starting of the vehicle. The HUD controller 414 may control the HUD device 500 to invert front and back sides of the display 802 repeatedly, and may eventually stop inverting the front and the back sides of the display 802 to provide the display 802 for the outside of the vehicle. Performing the display based on the animation that involves the inversion of the display in this manner enables a person inside the vehicle to reliably recognize the display 802 when performing the display to be provided for the outside of the vehicle.

Figure 5:
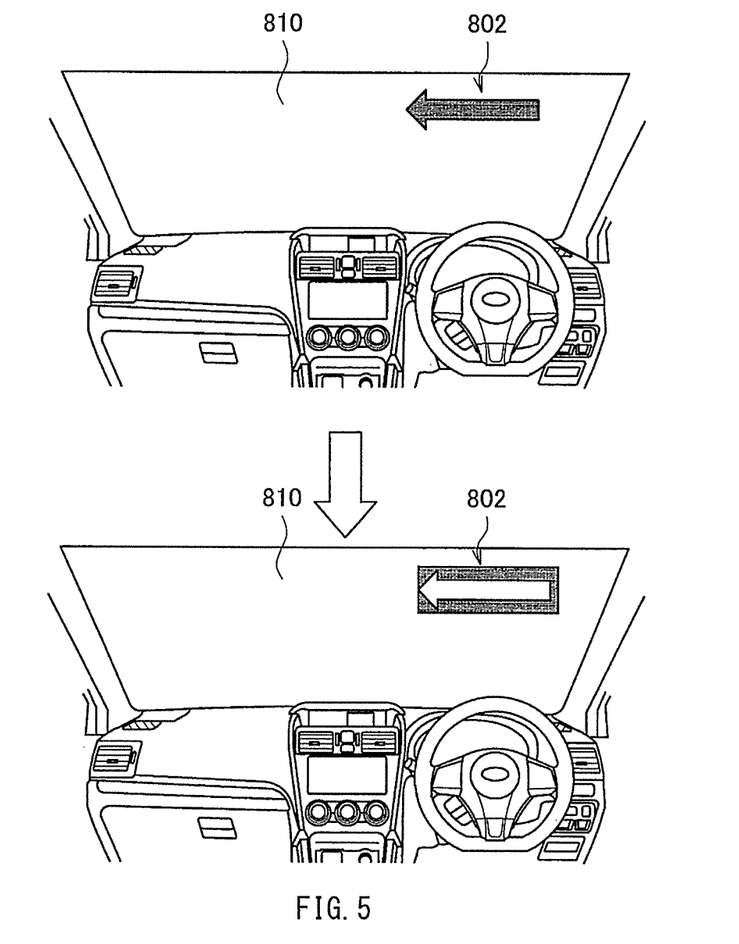
FIG. 5 schematically illustrates an example of a display based on inversion of positive and negative images.

FIG. 5 schematically illustrates an example of a display, according to one implementation, based on the inversion of the positive and the negative images. In one example illustrated in FIG. 5, the HUD controller 414 may control the HUD device 500 to display, on the windshield 810 of the vehicle, the display 802 of an arrow mark indicating a position of a person present outside the vehicle or a moving direction of the vehicle, for example. The HUD controller 414 may control the HUD device 500 to invert an image of the display from the positive image to the negative image and vice versa repeatedly, and may eventually stop inverting the positive and the negative images to provide the display 802 for the outside of the vehicle. Performing the display based on the inversion of the positive and the negative images in this manner enables a person inside the vehicle to reliably recognize the display 802 when performing the display to be provided for the outside of the vehicle.

Figure 6:
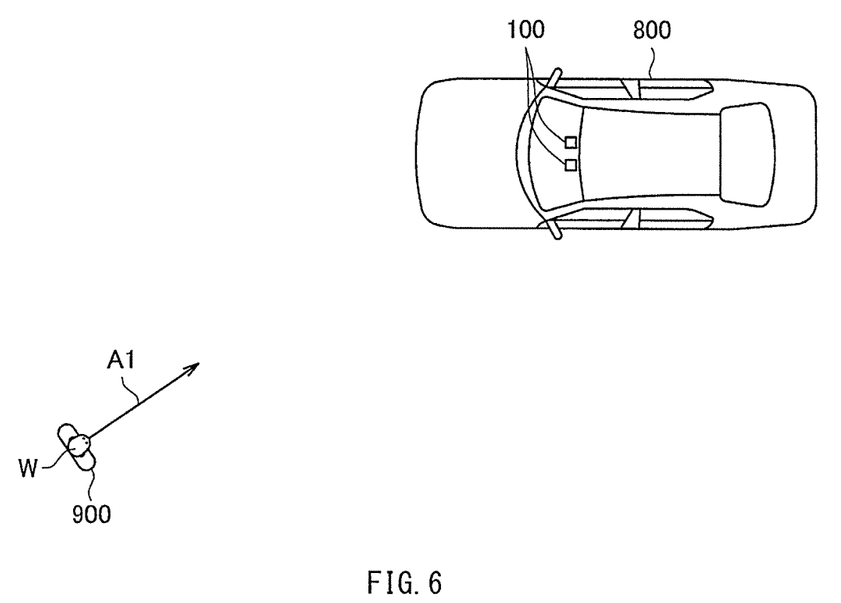
FIG. 6 schematically illustrates an example of a method of determining whether a person outside a vehicle is aware of the vehicle.

When the person outside a vehicle 800 is aware of the vehicle 800, the HUD controller 414 may control the HUD device 500 to change a position and size of the display provided for the outside of the vehicle, thereby making the displayed image less conspicuous. FIG. 6 schematically illustrates an example of a method of determining whether the person 900 outside the vehicle 800 is aware of the vehicle 800. FIG. 6 illustrates states of the vehicle 800 and the person 900 as seen from the top. As illustrated in FIG.

6, the vehicle-exterior sensors 100 may detect the person 900. Then, the environment information acquiring unit 402 may detect a face orientation of the person 900. On the basis of these detection results, the environment state determiner 407 may determine an arrow mark A1 indicating the face orientation which starts from a position W of the person 900. If the arrow mark A1 extends in a direction toward the vehicle 800, the environment state determiner 407 may determine that the person 900 is aware of the vehicle 800.

Figure 7:
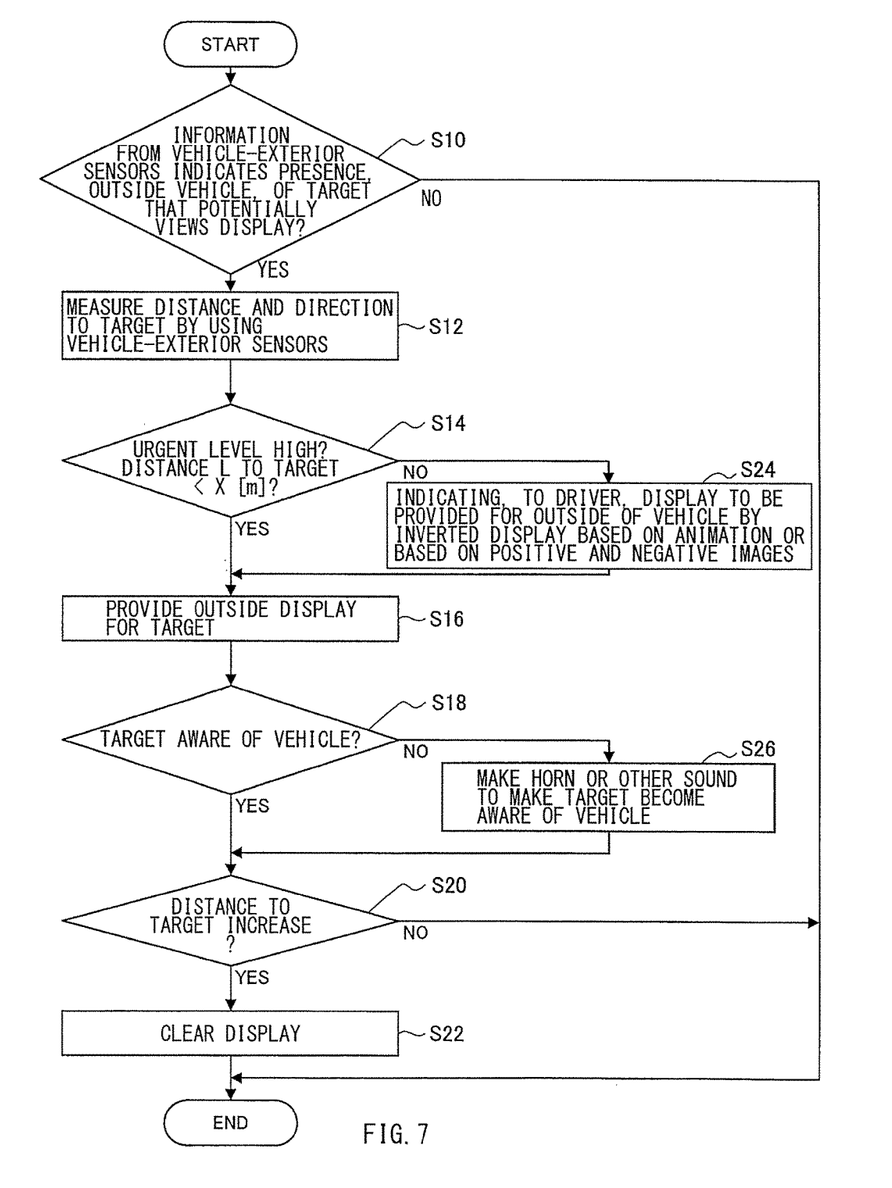
FIG. 7 is a flowchart of an example of a process performed by the vehicle display system according to one implementation.

Next, a description is given of an example of a process performed by the vehicle display system 1000 according to one implementation, with reference to a flowchart of FIG. 7. The process of FIG. 7 may be performed by the components of the controller 400 and may be repeated during predetermined control periods. In step S10, the environment state determiner 407 may determine whether a target, e.g., the person 900 who potentially views a display to be provided by the HUD device 500 is present outside the vehicle, on the basis of the information acquired from the vehicle-exterior sensors 100. When the environment state determiner 407 determines in step S10 that the target is present outside the vehicle (S10: YES), the flow may proceed to step S12 in which the environment information acquiring unit 402 acquires a distance and direction to the person 900. Thereafter, in step S14, the distance determiner 410 may determine whether a distance L from the vehicle 800 to the person 900 is equal to or less than a predetermined threshold X. When the distance determiner 410 determines that the distance L is less than the threshold X (S14: YES), the distance determiner 410 may determine that the urgent level is high, after which the flow may proceed to step S16. In step S16, the HUD controller 414 may control the HUD device 500 to provide the display 802 for the person 900. When the distance determiner 410 determines that the distance L is equal to or greater than the threshold X (S14: NO), the flow may proceed to step S24. In step S24, the HUD controller 414 may control the HUD device 500 to perform the inverted display, e.g., may perform the display based on the animation that involves the inversion of the display as illustrated in FIG. 4 or may perform the display based on the inversion of the positive and the negative images as illustrated in FIG. 5, thereby indicating, to the driver, the display 802 to be provided for the outside of the vehicle. After step S24 has been performed, the flow may proceed to step S16, in which the HUD controller 414 may control the HUD device 500 to provide the display 802 for the target.

After step S16 has been performed, the flow may proceed to step S18, in which the environment state determiner 407 may determine whether the person 900 is aware of the vehicle 800. For example, the environment state determiner 407 may employ the method illustrated in FIG. 6 to determine whether the person 900 is aware of the vehicle 800. When the environment state determiner 407 determines that the person 900 is aware of the vehicle 800 (S18: YES), the flow may proceed to step S20. In step S20, the distance determiner 410 may determine whether the distance to the target increases. In one example implementation, when the distance to the target is equal to or greater than another predetermined threshold that is greater than the threshold X, the distance determiner 410 may determine that the distance to the target increases. When the distance to the target increases (S20: YES), the flow may proceed to step S22. In step S22, the HUD controller 414 may control the HUD device 500 to clear the display, and may terminate the process in this control period (END).

When the environment state determiner 407 determines that the person 900 is not aware of the vehicle 800 in step S18 (S18: NO), the flow may proceed to step S26. In step S26, the speakers 600 may make a horn or other sound in order to make the target become aware of the vehicle. After step S26 has been performed, the flow may proceed to step S20.

When the distance to the target does not increase in step S20 (S20: NO), the HUD controller 414 may control the HUD device 500 to clear the display, and may terminate the process in this control period (END). The HUD controller 414 may also terminate the process in this control period (END) when the environment state determiner 407 determines in step S10 that the target is not present outside the vehicle (S10: NO).

According to one implementation, as described above, the vehicle display system 1000, when providing a display for a person outside a vehicle, inverts the display, thereby enabling a driver or other person inside the vehicle to reliably recognize a content of the display to be provided for the person outside the vehicle. Further, in one implementation, if the urgent level is high, such as when the person is approaching the vehicle, the vehicle display system 1000 may provide the display for the person outside the vehicle without inverting the display, thereby enabling the person outside the vehicle to reliably recognize a content of the display.

The controller 400 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 400. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 400 illustrated in FIG. 1.

Although some implementations of the technology have been described in the foregoing with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle display system comprising:
   a display device configured to display on a window of a vehicle a first image and a second image which is an inverted image of the first image;
   a position acquiring unit configured to acquire a position of a target person present outside the vehicle; and
   a display controller configured to control the display device to alternately display the first image and the second image on the window based on the position of the target person, wherein the display controller stops displaying the one of the first image and the second image based on determining that the target person is aware of the vehicle.

2. The vehicle display system according to claim 1, wherein when the first image and the second image are texts, the first image is for the target person and the second image is for an occupant inside the vehicle, and when the first image and the second image are symbols, the first image is a positive image and the second image is a negative image.

3. The vehicle display system according to claim 1, wherein when a distance from the vehicle to the target person is equal to or greater than a first threshold, the display controller controls the display device to alternately display the first image and the second image on the window.

4. The vehicle display system according to claim 2, wherein when a distance from the vehicle to the target person is equal to or greater than a first threshold, the display controller controls the display device to alternately display the first image and the second image on the window.

5. The vehicle display system according to claim 3, wherein the display controller controls the display device to alternately display the first image and the second image on the window and then controls the display device to display one of the first and second images on the window for the target person.

6. The vehicle display system according to claim 4, wherein the display controller controls the display device to alternately display the first image and the second image on the window and then controls the display device to display one of the first and second images on the window for the target person.

7. The vehicle display system according to claim 5, wherein the display controller stops displaying the one of the first image and the second image based further on determining that the distance from the vehicle to the target person is equal to or greater than a predetermined second threshold.

8. The vehicle display system according to claim 6, wherein the display controller stops displaying the one of the first image and the second image based further on determining that the distance from the vehicle to the target person is equal to or greater than a predetermined second threshold.

9. The vehicle display system according to claim 7, further comprising a warning sound generator configured to make a warning sound, when the target person is not aware of the vehicle.

10. The vehicle display system according to claim 8, further comprising a warning sound generator configured to make a warning sound, when the target person is not aware of the vehicle.

11. A method of controlling a vehicle display system displaying an image on a window of a vehicle, the method comprising:

acquiring a position of a target person present outside a vehicle;

alternately displaying a first image and a second image on the window based on the position of the target person, the second image being an inverted image of the first image; and stopping displaying the one of the first image and the second image based on determining that the target person is aware of the vehicle.

12. A vehicle display system comprising:

a display device configured to display on a window of a vehicle a first image and a second image which is an inverted image of the first image; and circuitry configured to acquire a position of a target person present outside the vehicle, control the display device to alternately display the first image and the second image on the window based on the position of the target person, and control the display device to stop displaying the one of the first image and the second image based on determining that 1) the target person is aware of the vehicle and 2) a distance between the position of the target person and a position of the vehicle is equal to or greater than a threshold.

* * * * *